(12) United States Patent
Willey et al.

(10) Patent No.: US 11,549,600 B2
(45) Date of Patent: Jan. 10, 2023

(54) ROTARY VALVE

(71) Applicant: Cummins Ltd, London (GB)

(72) Inventors: Donald E. Willey, Huddersfield (GB); Matthew Brookes, Huddersfield (GB)

(73) Assignee: CUMMINS LTD., Ondon (GB)

(*) Notice: Subject to any disclaimer, the term of this patent is extended or adjusted under 35 U.S.C. 154(b) by 0 days.

(21) Appl. No.: 17/293,170

(22) PCT Filed: Nov. 11, 2019

(86) PCT No.: PCT/GB2019/053191
§ 371 (c)(1),
(2) Date: May 12, 2021

(87) PCT Pub. No.: WO2020/099848
PCT Pub. Date: May 22, 2020

(65) Prior Publication Data
US 2022/0010883 A1    Jan. 13, 2022

(30) Foreign Application Priority Data
Nov. 13, 2018    (GB) .................................... 1818505

(51) Int. Cl.
*F16K 11/076*    (2006.01)
*F02B 37/18*    (2006.01)
(Continued)

(52) U.S. Cl.
CPC .......... *F16K 11/076* (2013.01); *F02B 37/183* (2013.01); *F02B 37/22* (2013.01);
(Continued)

(58) Field of Classification Search
CPC ...... F16K 11/076; F02B 37/183; F02B 37/22; F02B 37/025; F02D 9/16; F02D 35/00;
(Continued)

(56) References Cited

U.S. PATENT DOCUMENTS

2011/0123315 A1    5/2011    Robinson
2015/0337717 A1    11/2015    Robinson et al.
(Continued)

FOREIGN PATENT DOCUMENTS

| CN | 104295361 A | 1/2015 |
| CN | 104895667 A | 9/2015 |
| WO | 2019038541 A1 | 2/2019 |

OTHER PUBLICATIONS

UK Search Report for UK patent application No. GB1818505.8, dated Apr. 23, 2019.
International Search Report and Written Opinion, issued by the European Patent Office, dated Jan. 24, 2020 for International Application No. PCT/GB2019/053191; 8 pages.
(Continued)

*Primary Examiner* — Brandon D Lee
(74) *Attorney, Agent, or Firm* — Faegre Drinker Biddle & Reath LLP

(57) ABSTRACT

A rotary turbine bypass valve comprises a valve chamber and a valve rotor. The chamber is positioned at a junction of an inlet port, an outlet port and a bypass port. The inlet port is configured to receive exhaust gas, the outlet port is configured to fluidly communicate with a turbine inlet, and the bypass port is configured to fluidly communicate with an exhaust aftertreatment device.
The rotor comprises a first and second recess, the first recess defining a primary flow passage, the second recess defining a secondary flow passage. The rotor is rotatable between a first position in which the rotor substantially blocks exhaust gas flow through the bypass port and a second position in which the rotor permits such. The secondary flow passage is configured to selectively permit fluid communication between the inlet port and the bypass port when the primary flow passage is partially blocked.

18 Claims, 9 Drawing Sheets

(51) Int. Cl.
  *F02D 35/00* (2006.01)
  *F02B 37/22* (2006.01)
  *F02D 9/16* (2006.01)
  *F01N 3/021* (2006.01)
  *F01N 3/10* (2006.01)
  *F01N 3/20* (2006.01)

(52) U.S. Cl.
  CPC .............. *F02D 9/16* (2013.01); *F02D 35/00* (2013.01); *F01N 3/021* (2013.01); *F01N 3/106* (2013.01); *F01N 3/2066* (2013.01)

(58) Field of Classification Search
  CPC . F02D 9/06; F01N 3/021; F01N 3/106; F01N 3/2066; F01N 2240/36; F01N 2340/06; F01N 13/08; Y02T 10/12; F02M 26/43
  See application file for complete search history.

(56) References Cited

U.S. PATENT DOCUMENTS

| | | | |
|---|---|---|---|
| 2017/0101925 A1* | 4/2017 | Robinson | F02B 37/183 |
| 2018/0023460 A1* | 1/2018 | Mawer | F16K 11/076 |
| | | | 251/304 |
| 2018/0238226 A1* | 8/2018 | Wang | F02B 37/025 |

OTHER PUBLICATIONS

International Preliminary Report on Patentability received for PCT Patent Application No. PCT/GB2019/053191, dated May 27, 2021, 7 pages.

Chinese Office Action for Chinese patent application No. 20198088297.2, dated Jul. 15, 2022, with English translation.

* cited by examiner

ROTARY VALVE

CROSS-REFERENCE TO RELATED APPLICATIONS

The present application is a national stage application under 35 U.S.C. § 371 of PCT Application No. PCT/GB2019/053191, filed Nov. 11, 2019, which claims priority to U.K. Application No. 1818505.8, filed Nov. 13, 2018, the entire disclosures of which being hereby expressly incorporated herein by reference.

FIELD OF THE DISCLOSURE

The present disclosure relates to a rotary valve. In particular, the present disclosure relates to a rotary turbine bypass valve suitable for bypassing an inlet to a turbine.

BACKGROUND

Turbines are well known devices for converting the kinetic energy within a flowing gas into useful work. In particular, known turbines convert the kinetic energy of flowing gas into rotation of a rotor (or turbine wheel) of the turbine. The rotation of the rotor may be transmitted by a suitable linkage to any device suitable for doing useful work. Examples of such devices include a power generator (such that the turbine forms part of a power turbine) and a compressor (such that the turbine forms part of a turbocharger).

As is well known in the art, turbochargers function by their turbine receiving exhaust gas from an internal combustion engine and consequently rotating a turbine wheel of the turbocharger so as to drive rotation of a compressor wheel. The compressor wheel draws in gas and pressurises it so that the gas output by the compressor is at an elevated pressure (or boost pressure) as compared to that at the inlet of the compressor. The output of the compressor of the turbocharger (i.e. the gas at boost pressure) can be fed to an inlet of the internal combustion engine of which the turbocharger forms part.

In some applications of turbine, a turbine bypass valve may be required to enable exhaust gas produced by the engine, to which the turbine is attached, to bypass the turbine so the exhaust gas flows to an exhaust aftertreatment system of the engine without passing through the turbine.

One known type of turbine bypass valve is a rotary valve. A rotary valve includes a housing defining a valve chamber positioned at a junction of an inlet port, an outlet port and a bypass port. A valve rotor is supported for rotation in the valve chamber. The valve rotor is rotatable about a valve axis between a first position in which the valve rotor permits gas flow through the bypass port and a second position in which the valve rotor blocks gas flow through the bypass port.

There exists a need to provide an alternative rotary turbine bypass valve which overcomes one or more of the disadvantages of known bypass valves whether set out above or otherwise. Additionally, there is a need for an alternative rotary turbine bypass valve.

SUMMARY

According to a first aspect of the disclosure there is provided a rotary turbine bypass valve for an engine arrangement, the rotary turbine bypass valve comprising:

a valve chamber positioned at a junction of an inlet port, an outlet port and a bypass port, the inlet port configured to fluidly communicate with a flow of exhaust gas from an engine, the outlet port configured to fluidly communicate with an inlet of a turbine, and the bypass port configured to fluidly communicate with an exhaust aftertreatment device; and a valve rotor supported for rotation, about a valve axis, within the valve chamber, the valve rotor comprising a first recess and a second recess, the first recess defining at least part of a primary flow passage, the second recess defining at least part of a secondary flow passage;

wherein the valve rotor is rotatable about the valve axis between a first position in which the valve rotor substantially blocks exhaust gas flow through the bypass port and a second position in which the valve rotor permits exhaust gas flow through the bypass port; and wherein the secondary flow passage is configured to selectively permit fluid communication between the inlet port and the bypass port when the primary flow passage is at least partially blocked.

The engine arrangement may form part of an automotive vehicle such as an automobile. More specifically, the vehicle may be a car, truck, bus, train or the like. The engine arrangement may be an internal combustion engine. The internal combustion engine may be a petrol engine or a diesel engine. The internal combustion engine may otherwise be a natural gas or Liquefied Petroleum Gas (LPG) engine, or some other variety of engine. The engine arrangement may be a hybrid arrangement which comprises the aforementioned internal combustion engine.

The turbine may form part of a turbocharger or a power turbine.

The valve chamber may be generally cylindrical. The valve chamber may be a blind bore.

The inlet port, bypass port and outlet port may be arranged in any appropriate relative orientation. One such example, when viewed in axial cross-section (i.e. cross-section normal to the axis of rotation of the rotary valve), the outlet port is generally opposite the inlet port and the bypass port is disposed between the inlet port and the outlet port. The bypass port may be closer to the inlet port than the outlet port. The bypass port may be substantially next to the inlet port. An angle between the inlet port and the bypass port may be acute i.e. less than 90°.

The inlet port, bypass port and outlet port may have any appropriate geometry. For example, the ports may be generally circular, generally elliptical, generally rectangular or some other polygonal shape. The ports may not all have the same geometry and/or dimensions. The ports may not all have the same cross-sectional area.

The inlet port, bypass port and outlet port may be directly connected to their respective regions/components of the engine arrangement with which they are in fluid communication. Alternatively, other components or connections may be present between the ports and the regions/components of the engine arrangement with which they are in fluid communication. For example, other components or connections may interpose the engine of the vehicle and the inlet port.

The flow of gas exhaust gas from the engine may comprise all of the exhaust gas from the engine, or a portion thereof.

The turbine may be a dual-inlet or twin-volute turbine. Alternatively, the turbine may be a single-inlet turbine. The turbine may be a fixed geometry turbine. The turbine may be a variable geometry turbine.

The exhaust aftertreatment device may comprise one or more of a selective catalytic reduction (SCR) catalyst, diesel particulate filter (DPF) or other particulate filter, Diesel Oxidation catalyst, Lean NOx catalyst, NOx absorber, or any other appropriate exhaust aftertreatment technology. The exhaust aftertreatment device may form part of an exhaust system. The exhaust system may further comprise a reductant. The reductant may otherwise be referred to as a reducing agent.

The exhaust aftertreatment device may perform more efficiently at a higher temperature than room temperature. The exhaust aftertreatment device may perform more efficiently with increasing temperature. That is to say, increasing the temperature of the exhaust gas flow may increase the efficiency of performance of the exhaust aftertreatment device. The exhaust aftertreatment device may have an activation or operating temperature which it must reach before the device functions to an acceptable efficiency.

The valve rotor may be generally cylindrical. The valve rotor may be manufactured from metal. The valve rotor may incorporate a spindle about which the valve rotor rotates. A first end of the spindle may be received in a corresponding bore in the valve chamber. A bush may be seated in the bore such that the spindle is received in the bush and is thus able to rotate in the bush. A second end of the spindle may be received in a second bush. An actuator may be used to control the rotational position of the valve rotor and hence the state of the rotary turbine bypass valve. One of the spindles may be mechanically linked to (or in rotational communication with) the actuator. In particular, one of the spindles may be directly connected to the actuator.

The valve rotor may completely block exhaust gas flow through the bypass port when in a bypass port blocking position. Alternatively, the valve rotor may substantially block exhaust gas flow through the bypass port when in the bypass port blocking position. If the valve rotor is able to rotate to a position whereby the outlet port is substantially blocked, some leakage through the outlet port may be allowable. Alternatively, in some embodiments, the valve rotor may be able to rotate to a position whereby the outlet port is completely blocked.

The valve rotor may incorporate sealing features to reduce leakage of exhaust gas flow through the bypass port when in the bypass port blocking position.

The bypass port may be connected directly, or indirectly, to the exhaust aftertreatment device. That is to say, the bypass port may, in some embodiments, be connected to the exhaust aftertreatment device via an interposing passage or component. In some embodiments, the bypass port may be connected to a turbine outlet passage, and the turbine outlet passage may then be connected to the exhaust aftertreatment device.

The disclosure provides the benefit that the temperature of the exhaust gas which flows to the aftertreatment device via the bypass port can be increased. This is owing to the at least partial blockage of the primary flow passage. The secondary flow passage provides fluid communication between the inlet port and the bypass port even when the primary flow passage is at least partially blocked. This means that even at low engine loads and RPM's, whereby the exhaust gas temperature would normally not be sufficiently high to activate or increase the efficiency of the aftertreatment device, the exhaust gas temperature and/or pressure can be adjusted to activate or increase the efficiency of the aftertreatment device.

The second recess may be smaller than the first recess.

In other words, a volume of (or associated with, or defined by) the second recess may be less than a volume of (or associated with, or defined by) the first recess.

The second recess being smaller than the first recess is advantageous in that the primary flow passage is therefore larger than the secondary flow passage. The reduced cross-section of the secondary flow passage assists in increasing the back pressure of the exhaust gas and further increasing the temperature of the exhaust gas (which may flow to the exhaust aftertreatment device) as a result thereof.

The second recess may span at least a portion of an outer circumference of the valve rotor.

The second recess is advantageously easier to manufacture when it spans at least a portion of the outer circumference of the valve rotor.

The second recess may oppose the first recess.

The first and second recesses opposing one another is intended to mean that the recesses are disposed across from one another about the valve axis. Put another way, the first and second recesses may be diametrically opposed.

Such an arrangement may be advantageous for reasons of improved balancing of the valve rotor. That is to say, the valve rotor may be more balanced for rotation about the valve axis, which may be desirable for reasons of reduced wear and improved longevity.

The first and second recesses may be separated by a barrier.

The barrier may otherwise be referred to as a sealing section.

The barrier may defines a chord of the valve rotor.

The valve rotor may be movable about the valve axis to selectively open and close the primary flow passage whilst the secondary flow passage remains open.

The aforementioned function may otherwise be referred to as modulation.

Modulation is advantageous in that the pressure of the exhaust gas can be adjusted. As a result, the exhaust temperature can also therefore be adjusted. This can be used to ensure that the back pressure generated across the rotary valve is not unnecessarily high when not required. An increased back pressure reduces the fuel economy of the engine. In other words, the back pressure is inversely proportional to the fuel economy. Put another way, once a required temperature of exhaust gas is reached, modulation can be used to reduce the back pressure and therefore increase the fuel economy.

The secondary flow passage may be configured to selectively provide fluid communication between the inlet port and the bypass port when the primary flow passage is substantially blocked.

The primary flow passage being substantially blocked whilst the secondary flow passage is open leads to the highest temperatures and pressures of the exhaust gas which can be actively diverted to the bypass port. This is because substantially all of the exhaust gas flows through the secondary flow passage to the bypass port.

The first and second recesses may occupy substantially the same axial extent of the valve rotor.

Put another way, the first and second recesses have substantially the same axial lengths along the length of the valve rotor.

The second recess may be one or more of generally rectangular, triangular, and/or teardrop-shaped.

Generally rectangular may be a geometry having two pairs of substantially parallel sides. The corners of the rectangular geometry may be filleted i.e. rounded.

Generally triangular may mean a shape with a substantially horizontal base, and two inclined sides stemming from ends of the base and merging at an apex. The apex may be rounded. The other corners may be rounded. The inclines sided may be arcuate. Generally triangular may be interpreted to include a shape like that of a sole plate of an iron.

Teardrop-shaped may refer to an ellipse with a pointed end.

As well as the above shapes, the second recess may be any one of a variety of further shapes. For example, the second recess may be some arbitrary shape, such as substantially wine-glass-shaped (e.g. substantially semicircular with a pointed tip).

The second recess being any one or more of the above shapes or geometries is intended to refer to a shape defined by the recess when the valve rotor is viewed from a radial perspective. In other words, the shape which would be formed if the (opening of the) second recess was to be filled with material, and the material was then removed and laid flat.

Where the second recess is of a geometry with a cross-sectional area which changes with the circumferential position about which the cross-section is taken (i.e. triangular, teardrop-shaped etc.), the second recess may be said to have a wide end and a thin end. Put another way, where a width of the second recess varies with a circumferential position about the valve rotor, the second recess may be said to have a wide end and a thin end.

It may be advantageous to have the second recess oriented such that the thin end is more directly exposed to the inlet port than the deep end is exposed to the inlet port when the rotary valve exhibits a thermal management regime. This is such that the thin end can be used to gradually open the secondary flow passage.

Alternatively, it may be desirable to have the second recess oriented such that the deep end is more directly exposed to the inlet port than the shallow end is. This may be for the reason that it may be desirable to initially open the secondary flow passage to a greater extent, and then gradually further open the secondary flow passage.

The aforementioned geometries may refer to the second recess when an outer surface of the valve rotor is unwrapped. That is to say, the geometry of the second recess may refer to the shape of the second recess if the cylindrical exterior of the valve rotor was to be laid out flat.

The geometry and/or depth of the second recess, or second recesses, may be varied to modify the flow area versus rotational position of the valve rotor behavior, or characteristics.

The second recess may have a substantially uniform depth.

Substantially uniform depth may mean that the second recess is of a substantially constant depth. In other words, the second recess is recessed to substantially the same extent across the whole second recess.

A uniform, or substantially uniform, depth of the second recess may be advantageous for reasons of simpler manufacture.

The second recess may have a non-uniform depth.

The second recess having a non-uniform depth may mean that the depth of the second recess varies substantially continuously circumferentially and/or axially. Alternatively, the non-uniform depth may mean that the second recess has discrete variations of depth e.g. a first section recessed to a first extent, and a second section recessed to a second extent. The non-uniform depth may also refer to a repeating, or non-repeating, pattern of depths.

The non-uniform depth of the second recess may be beneficial for reasons of being able to adjust, more accurately, the extent to which the secondary flow passage is open. That is to say, the non-uniform depth of the second recess may allow the extent of fluid communication between the inlet port and the bypass port, via the secondary flow passage, to be varied to a greater degree.

The depth may otherwise be described as a channel depth.

The non-uniform depth of the second recess may give rise to different flow areas, or cross-sectional areas, through which exhaust gas can flow at different rotational positions of the valve rotor. Different rotational positions of the valve rotor may otherwise be described as different angular positions of the valve rotor.

Where the second recess is of a non-uniform depth, the second recess may be said to have a shallow end and a deep end.

It may be advantageous to have the second recess oriented such that the shallow end is more directly exposed to the inlet port than the deep end is exposed to the inlet port when the rotary valve exhibits a thermal management regime. This is such that the shallow end can be used to gradually open the secondary flow passage.

Alternatively, it may be desirable to have the second recess oriented such that the deep end is more directly exposed to the inlet port than the shallow end is. This may be for the reason that it may be desirable to initially open the secondary flow passage to a greater extent, and then gradually further open the secondary flow passage.

The second recess may be one of two second recesses forming part of a secondary arrangement, and the first recess may be one of two first recesses forming part of a primary arrangement.

A valve incorporating two first recesses and two second recesses is advantageously configured for use with a twin-inlet turbine.

Either or both of the second recesses may be one or more of generally rectangular, triangular, and teardrop-shaped.

Both of the second recesses may have substantially the same shape.

Same shape may refer to an outer geometry, boundary or perimeter of the recess, rather than a depth thereof.

The second recesses may have substantially the same depths.

In other words, a first of the second recesses may be recessed to substantially the same extent as a second of the second recesses.

The second recesses may have different depths.

The second recesses may be circumferentially aligned.

Put another way, the circumferential positions of the second recesses, about an outermost radius of the valve rotor, when viewed from an axial direction of the valve rotor, may be substantially the same. That is to say a portion of one of the second recesses has the same circumferential position as that of the equivalent portion of the other second recess.

The second recesses may be circumferentially offset.

In other words, there may be rotational offset of one of the second recesses relative to the other. That is to say a portion of one of the second recesses is circumferentially offset relative to the equivalent portion of the other second recess. This may be desirable for reasons of being able to provide different flow characteristics through each of the two inlets of a twin-inlet turbine.

The first and/or second arrangements may be symmetrically disposed about a length of the valve rotor.

The first and/or second arrangements being symmetrically disposed about the length of the valve rotor may be beneficial for reasons of improved balance of the valve rotor.

The turbine may form part of a turbocharger.

The disclosure is particularly advantageous when the turbine forms part of a turbocharger because the disclosure can be used to control the speed of the turbine and so boost pressures generated by a compressor of the turbocharger.

The turbocharger comprises the turbine and a compressor, the compressor being rotationally coupled to the turbine so as to be driven thereby.

According to a second aspect of the disclosure there is provided an engine arrangement comprising an engine, a turbine and the rotary turbine bypass valve according to the first aspect of the disclosure.

Optionally the engine arrangement comprises a turbocharger, the turbine forming part of the turbocharger.

According to a third aspect of the disclosure there is provided a method of operating the rotary turbine bypass valve according to the first aspect of the disclosure, wherein the rotary turbine bypass valve exhibits the following flow regimes in order as the valve rotor rotates from a position in which the outlet port is substantially blocked:

(i) a complete turbine bypass regime in which the outlet port is substantially blocked by the valve rotor;

(ii) a braking regime in which the inlet port is substantially blocked;

(iii) a thermal management regime in which the primary flow passage is at least partially blocked and the secondary flow passage permits fluid communication between the inlet port and the bypass port;

(iv) a 100% turbine regime in which the bypass port is substantially blocked and the inlet and outlet ports are open; and (v) a wastegate regime in which the outlet port is open and the bypass port is at least partially open.

The rotational position of the valve rotor may be adjusted from the position of step (iii) to increase or reduce the extent of the blockage of the primary flow passage to adjust a temperature and/or pressure of the exhaust gas in the inlet port.

The adjustment of temperature and/or pressure of the exhaust gas may otherwise be referred to as modulation.

No fuel may be supplied to the engine during step (ii).

It will be appreciated that any of the above-discussed aspects of the disclosure may, where appropriate, be combined with one or more other aspects of the disclosure. Furthermore, an optional feature described in relation to one of the aspects of the disclosure may, where appropriate be an optional feature of one of the other aspects of the disclosure.

BRIEF DESCRIPTION OF THE DRAWINGS

The disclosure will now by described by way of example, with reference to the accompanying figures in which.

DETAILED DESCRIPTION OF EMBODIMENTS OF THE DISCLOSURE

Figure 1A:
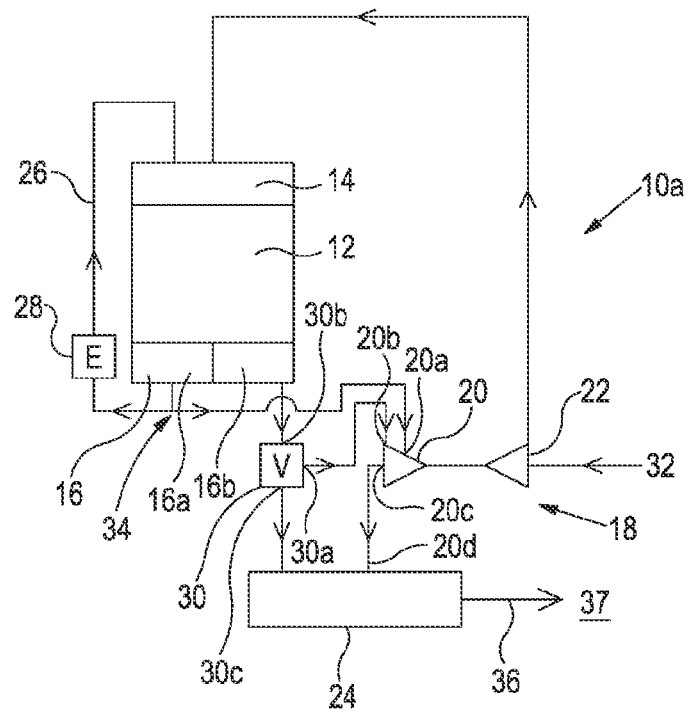
FIG. 1a shows a schematic view of a known engine arrangement of which a rotary valve according to an embodiment of the present disclosure may form part.

FIG. 1a shows a schematic view of a known engine arrangement 10a. The engine arrangement includes a plurality of combustion chambers 12 which are connected to an inlet manifold 14 and an outlet manifold 16. The outlet manifold 16 is separated into a first portion 16a and a second portion 16b. The first portion 16a of the outlet manifold is connected to a first set (not shown) of the combustion chambers 12, and the second portion 16b of the outlet manifold 16 is connected to a second set (again, not shown) of the combustion chambers 12.

The engine arrangement also comprises a turbocharger 18 having, as is well known, a turbine 20 and a compressor 22. The engine arrangement further includes an exhaust aftertreatment system 24, an EGR (exhaust gas recirculation) circuit 26, which includes an EGR valve 28, and a turbine bypass valve 30. The exhaust aftertreatment system 24 comprises one or more exhaust aftertreatment devices, as will be explained in detail below.

In use, the combustion chambers 12 are supplied with fuel and air, the air being provided from the atmosphere 37 via the engine air inlet 32, the air passing through the compressor 22 of the turbocharger 18 and inlet manifold 14. Once the fuel and air has been burnt in the combustion chambers 12, exhaust gas is produced which passes to the outlet manifold 16. The exhaust gas from the first portion 16a of the exhaust manifold 16 is supplied to a T-junction 34 at which it is split so that it flows both to an EGR circuit 26 and to a first inlet 20a of the turbine 20 of the turbocharger 18. The EGR circuit 26 passes back to the inlet manifold 14 and the amount of exhaust gas which passes into the EGR circuit 26 is controlled by the EGR valve 28. The manner in which the EGR circuit functions is entirely conventional and is not key to the present disclosure. Consequently, for the sake of brevity, further discussion as to the operation of the EGR circuit is omitted.

The turbine 20 of the turbocharger 18 is a twin inlet (or twin volute) turbine. As such, the turbine includes a second inlet 20b. This inlet 20b of the turbine 20 is supplied by a first outlet 30a of the bypass valve 30. The bypass valve 30 is in turn supplied with exhaust gas from the second portion 16b of the exhaust manifold 16 via an inlet 30b of the bypass valve 30.

The exhaust gas provided to the turbine 20 of the turbocharger 18 via the inlets 20a, 20b causes a turbine wheel (not shown) of the turbine 20 to rotate. The exhaust gas then exits the turbine 20 via the turbine outlet 20c and passes to an exhaust aftertreatment system 24 (which may include, for example, a particulate trap and/or selective catalytic reduction [SCR] arrangement). The exhaust gas passes from the turbine outlet 20c to the exhaust aftertreatment system 24 via a turbine outlet passage 20d. The exhaust gas then exits the aftertreatment system 24 via an engine outlet 36 to atmosphere 37. The rotation of the turbine wheel of the turbine, caused by the exhaust gases provided to the turbine 20, causes rotation of a compressor wheel (again, not shown) of the compressor 18. Rotation of the compressor wheel results in air at atmospheric pressure being drawn into the compressor through the engine inlet 32 to be pressurised to an elevated (or boost) pressure by the compressor wheel. This pressurised gas is then supplied to the inlet manifold 14 as previously discussed.

Figure 1B:
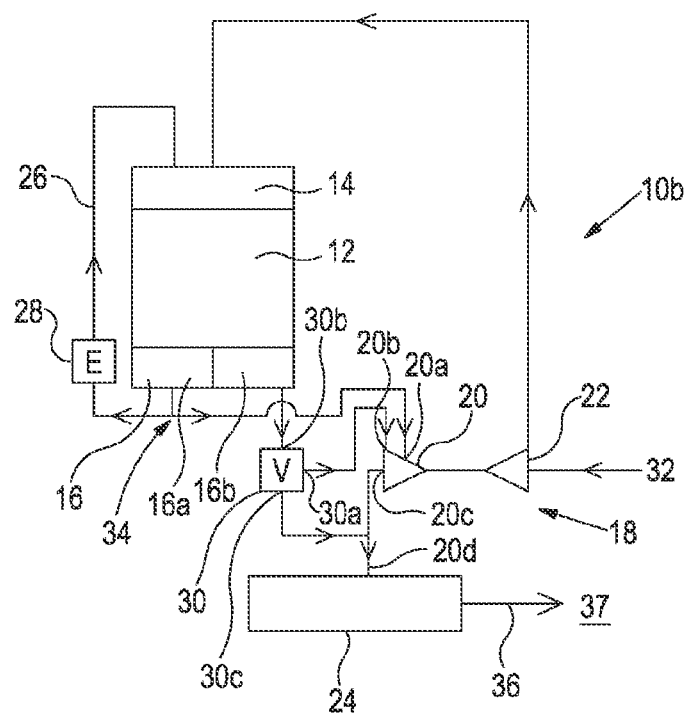
FIG. 1b shows a schematic view of an alternative engine arrangement to that shown in FIG. 1a, of which a rotary valve according to an embodiment of the present disclosure may also form part.

The bypass valve 30 also includes a second outlet 30c (or bypass outlet) which is connected to the aftertreatment system 24 (without going through the turbine). Whilst the second outlet 30c is connected to the exhaust aftertreatment system 24 without going through the turbine 20, in some embodiments the second outlet 30c may be in fluid communication with the turbine outlet 20c. That is to say, rather than being connected directly to the exhaust aftertreatment system 24, the second outlet 30c may be connected to the exhaust aftertreatment system 24 via the turbine outlet passage 20d. This is illustrated in FIG. 1b, and will be described in more detail below.

The bypass valve 30 can be controlled so that it is possible to selectively open the second outlet 30c. When the second outlet 30c is open, at least some of the exhaust gas from the second portion 16b of the outlet manifold 16 which would have otherwise passed to the inlet 20b of the turbine 20 can flow via the outlet 30c to the aftertreatment system 24. Such gas is said to bypass the turbine 20. The ability for gas to bypass the turbine 20 may be advantageous in several situations. First, in a situation where it is desired to reduce the speed of the turbine, for example when the turbine 20 is over-speeding, the ability to bypass the turbine, and thereby reduce the amount of exhaust gas being supplied to the turbine will reduce the amount of exhaust gas rotating the turbine wheel and hence reduce the speed of the turbine wheel. Secondly, in some applications, the aftertreatment system 24 may only function effectively when it is at a required operating temperature. This may be the case when, for example, the after-treatment system 24 includes a temperature-sensitive catalyst. The required operating temperature of the aftertreatment system 24 may be considerably in excess of room temperature. Consequently, at some point during the operation of the engine arrangement 10a (for example, just after engine switch on) the aftertreatment system 24 may be operating at a temperature below the required operating temperature. In this situation, the bypass valve 30 can be opened such that some of the hot exhaust gas, which would otherwise pass to the turbine 20, passes to the aftertreatment system 24 without passing through the turbine 20, thereby causing the temperature of the aftertreatment system 24 to be raised relatively quickly so that it can reach its operating temperature.

Once it is no longer desired to allow some of the exhaust gas from the second portion 16b of the exhaust manifold 16 to bypass the turbine 20, the bypass valve 30 can be actuated so as to close it, thereby closing the second outlet 30c and ensuring that all of the exhaust gas passing into the bypass valve 30 from the second portion 16b of the exhaust manifold 16 passes to the turbine 20 of the turbocharger 18.

The engine arrangement 10a described above provides context as to the operation of a turbine bypass valve. It will be appreciated that a bypass valve according to the present disclosure may be utilised as part of any appropriate engine arrangement. For example, the engine arrangement discussed above includes a two-part exhaust manifold arrangement. Some suitable arrangements may instead include a single exhaust manifold with the valve being located between the exhaust manifold and the turbine inlet. In addition, although the disclosure is described in relation to a turbine which forms part of a turbocharger, the disclosure equally applies to any type of turbine, for example, but not limited to, a turbine that forms part of a power turbine. The turbine may include a twin inlet or twin volute as discussed above. Alternatively, the turbine may include any appropriate number of inlets and/or volutes, such as a single inlet and a single volute.

FIG. 1b shows an alternative engine arrangement 10b. The engine arrangement 10b of FIG. 1b is substantially the same as the engine arrangement 10a of FIG. 1a, save for the connection of the second outlet 30c of the bypass valve 30. Given the general similarities between the engine arrangements 10a, 10b, like features are indicated using the same reference numeral and will not be described in detail in connection with FIG. 1b.

In the engine arrangement 10b, the second outlet 30c of the bypass valve 30 is connected to the exhaust aftertreatment system 24 via the turbine outlet passage 20d. In other words, whilst in the engine arrangement 10a there are two separate exhaust gas flows which enter the exhaust aftertreatment system 24, in the engine arrangement 10b the two exhaust gas flows merge and enter the exhaust aftertreatment system as a single, combined flow. The combined flow passes through the turbine outlet passage 20d and into the aftertreatment system 24.

The specific structural details of a bypass valve according to the present disclosure are now discussed in more detail below.

Figure 2:
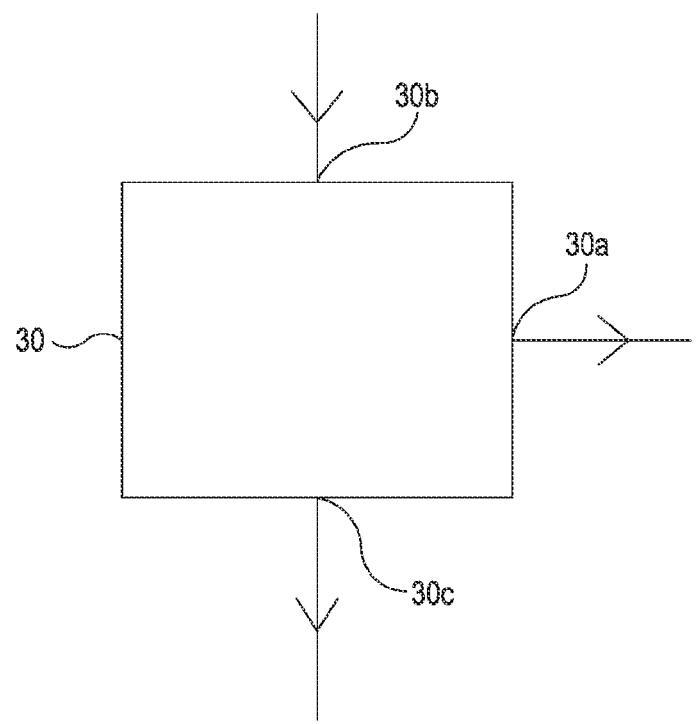
FIG. 2 shows an enlarged schematic view of a rotary valve according to an embodiment of the present disclosure.

FIG. 2 shows an enlarged schematic view of the valve 30. Features of this figure which correspond to those of FIG. 1 have been given the same reference numerals.

Figure 3:
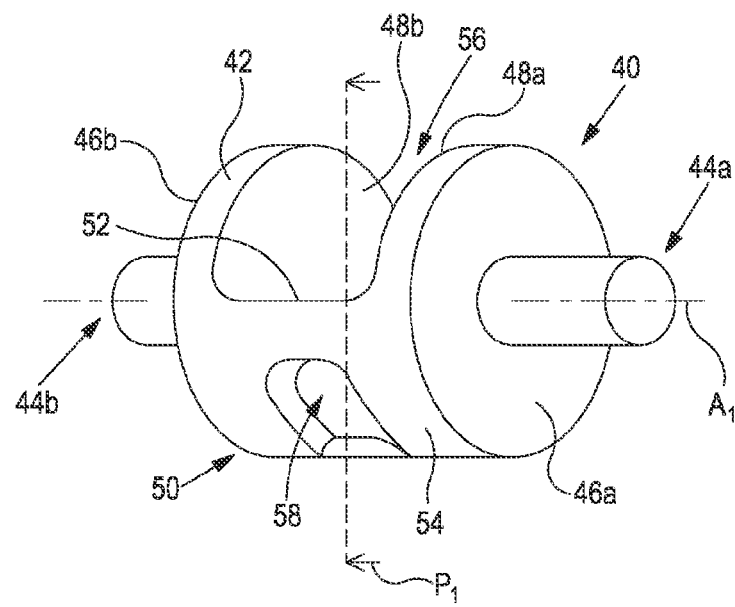
FIG. 3 shows a perspective view of a valve rotor according to an embodiment of the present disclosure.

FIG. 3 shows a perspective view of a valve rotor 40. As will be described in greater detail below, a combination of the valve rotor 40 and a valve chamber (not shown in FIG. 3) make up the valve 30, herein referred to as the rotary valve 30.

The valve rotor 40 rotates within the valve chamber to selectively permit or prevent fluid communication between an inlet port, an outlet port and a bypass port of the valve chamber. The inlet port, outlet port and bypass port correspond with the inlet 30b, the first outlet 30a and the second outlet 30c of the rotary valve 30 as shown in FIGS. 1 and 2).

Various operating modes of, and associated flow regimes of exhaust gas passing through, the rotary valve 30 will be described and illustrated in connection with FIGS. 4 and 5 below.

Returning to FIG. 3, the valve rotor 40 comprises a rotor body 42 and spindles 44a, 44b extending therefrom. Spindles 44a, 44b define an axis $A_1$ about which the valve rotor 40 rotates. The axis $A_1$ may otherwise be referred to as the valve axis.

The rotor body 42 comprises end walls 46a, 46b. These end walls 46a, 46b are axially offset from one another and so may be referred to as axially offset end walls. The axially offset end walls 46a, 46b define outermost edges of the rotor body 42. When the valve rotor 40 is located in the valve chamber, the axially offset end walls 46a, 46b are in facing relations with corresponding walls of the valve chamber. That is to say, the axially offset end walls 46a, 46b are received by the valve chamber.

The spindles 44a, 44b extend axially away from the axially offset end walls 46a, 46b. The spindles 44a, 44b are generally cylindrical and provide an axle about which the valve rotor 40 rotates. The spindles 44a, 44b are received by corresponding bores in the valve chamber. Spindles 44a, 44b may be a geometry other than generally cylindrical provided that the valve rotor 40 is still able to rotate about the valve axis $A_1$.

The rotor body 42 also comprises opposing internal walls 48a, 48b. The opposing internal walls 48a, 48b are also axially offset along valve axis $A_1$. Each of the internal walls 48a, 48b also opposes a corresponding end wall 46a, 46b respectively.

Disposed between internal walls 48a, 48b is a sealing section 50. Sealing section 50 comprises an internal surface 52 and an external surface 54.

A combination of the internal surface 52, and the internal walls 48a, 48b define a first recess 56. As such, the valve rotor 40 comprises the first recess 56. The first recess 56, in use, defines at least part of a primary flow passage between one or more of the inlet port, outlet port and bypass port. This is described in greater detail below. The first recess 56 may otherwise be described as a passage, or cavity.

The external surface 54 of the sealing section 50 comprises a second recess 58. In use, the second recess 58 defines at least part of a secondary flow passage, which will again be described in more detail below.

When the valve rotor 40 is positioned in the valve chamber, the rotational position of the valve rotor 40 dictates whether exhaust gas flow is permitted through, or blocked from passing through, the bypass port. When the valve rotor 40 is in a bypass port blocking position, the valve rotor 40 is in a rotational position such that the external surface 54 of the sealing section 50 covers, or substantially covers, the bypass port. Exhaust gas flow is thereby substantively prevented from flowing through the bypass port.

When the valve rotor 40 is not in a bypass port blocking position, the valve rotor 40 is in a rotational position such that the relative alignment of the external surface 54 of the sealing section 50 and bypass port permits the exhaust gas flow through the bypass port. That is to say, exhaust gas is able to flow into the bypass port via the first recess 56 of the valve rotor 40. Depending upon the geometry of the valve rotor 40, when the valve rotor 40 is not in the bypass port blocking position, the internal surface 52 of the sealing section 50 may obstruct the flow of exhaust gas such that the flow is impeded and is deflected towards the bypass port. That is to say, in certain valve rotor 40 positions, and with certain valve rotor 40 geometries, the internal surface 52 may act as a deflector plate for the exhaust gas flow. It will be appreciated that the exhaust gas is able to flow through the first recess 56 of the valve rotor 40.

It will also be appreciated that exhaust gas can flow through the second recess 58 of the valve rotor 40. As such, in some rotational positions of the valve rotor 40, the second recess 58 provides fluid communication between ports to thereby allow exhaust gas to flow therebetween. This is particularly advantageous in arrangements whereby it is desired to at least partially block the inlet port, for example in order to increase exhaust gas temperature, whilst still diverting a proportion of the exhaust gas flow via the bypass port. The second recess 58 enables this functionality. More detail will be provided in connection with this, and the other, operating modes below.

The valve rotor 40 may be turned from a single piece of metal. More broadly, features of the valve rotor 40 may be produced by machining. Alternatively, the end wall sections may be manufactured separately before being combined with the sealing section 50 in a separate operation. Further alternatively, the valve rotor 40 may be cast. The valve rotor 40 may include sealing features in order to improve valve performance.

The valve rotor 40 illustrated in FIG. 3 is adapted for use with a single inlet turbine. That is to say, there is a single first recess 56 and a single second recess 58. However, it will be appreciated that twin entry or twin volute turbines also exist, and that is desirable to be able to use a rotary valve according to the disclosure in combination therewith. Accordingly, FIG. 4 shows a perspective view of a second embodiment of a valve rotor 60.

The valve rotor 60 is adapted for use with a twin entry or twin volute turbine. As such, there are two arrangements of corresponding first and second recesses. A first arrangement 62 comprises the two first recesses 56a, 56b. A second arrangement 64 comprises the two secondary recesses 58a, 58b. The first and second arrangements may otherwise be referred to as first and second pairs. It will be appreciated from FIG. 4 that a first combination of the first recess 56a and the second recess 58a correspond with a first entry passage or volute of the turbine, whilst a second combination of the corresponding first recess 56b and second recess 58b correspond with a second entry passage or volute of the turbine.

The valve rotor 60 shares many features in common with the valve rotor 40, and so these features will not be described in detail in connection with FIG. 4. However, of note, due to the presence of two first recesses 56a, 56b, a wall section 66 is present in the valve rotor 60. The wall section 66 separates the two first recesses 56a, 56b.

Either or both of the valve rotors 40, 60 may be symmetrical about the valve axis. In other words, either or both of the valve rotors 40, 60 may be symmetrical along a length of the valve rotors 40, 60. Either or both of the first and second arrangements 62, 64 may be symmetrically disposed about a length of the valve rotor 60. Symmetrical features of the valve rotors 40, 60 may be desirable for reasons of improved balancing of the rotary valve 30, and so improved performance.

Figure 5:
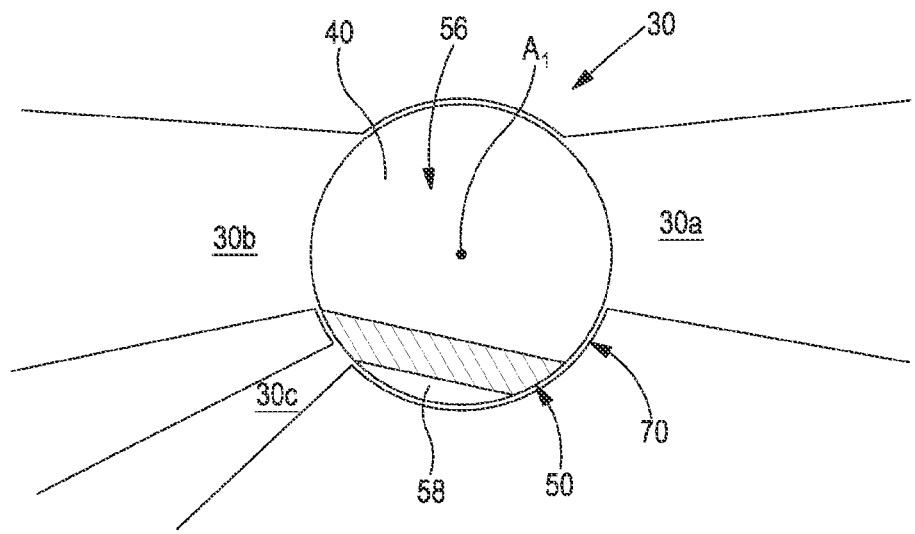
FIGS. 5-9 show various rotational positions of a valve rotor of a rotary valve according to an embodiment of the present disclosure.

FIG. 5 is a schematic side view of the rotary valve 30. In other words, FIG. 5 shows the valve rotor 40 inserted in a valve chamber 70. Of note, whilst valve rotor 40 is described in connection with FIGS. 5 to 9, the valve rotor 60 according to the alternative embodiment is operated in the same way, and so the description is equally applicable.

In FIG. 5 the valve rotor 40 is shown in a cross section view as indicated by plane $P_1$ in FIG. 3. Cross hatching is used to indicate the cutaway view of the valve rotor 40. In particular, a cross hatched section is indicated on the sealing section 50, which may otherwise be referred to as a barrier. Valve axis $A_1$ is also indicated on FIG. 5, along with first and second recesses 56, 58. Finally, the inlet port 30b, outlet port 30a and the bypass port 30c are also labelled on FIG. 5.

As has been described in connection with the previous figures, rotation of the valve rotor 40 about the valve axis $A_1$ can be used to selectively block or open one or more of the inlet port 30b, outlet port 30a and bypass port 30c. Exhaust gas flowing through the inlet port 30b can therefore be selectively directed to flow through the first recess 56 and/or the second recess 58, or through neither recess.

To recap the description in connection with FIGS. 1 and 2, the inlet port 30b is connected to the engine, the outlet port 30a is connected to an inlet of the turbine 20, and the bypass port 30c is connected to the exhaust aftertreatment system 24. Specifically, the inlet port 30b is downstream of the engine, the outlet port 30a is upstream of the turbine 20 and the bypass port 30c is upstream of the exhaust aftertreatment system 24.

The various flow regimes which the rotary valve can be used to implement will now be described. For the purposes of this document, the terms flow regime and operating mode are used interchangeably. These terms simply refer to the different manners of valve operation which are attributable to the various rotational positions of the rotary valve 30, specifically the valve rotor 40 thereof.

FIG. 5 shows the rotary valve 30 in a 100% turbine regime. That is to say, in the FIG. 5 arrangement, the exhaust gas which flows through the inlet port 30*b* also flows through the outlet port 30*a*. Substantially all the exhaust gas which enters the valve chamber 70 is directed through the outlet port 30*a*, towards the turbine. The bypass port 30*c* is blocked, or substantially blocked, in this arrangement. That is to say, there is minimal, if any, exhaust gas flow through the bypass port 30*c*, and so to the aftertreatment system. In the rotational position of the valve rotor 40 shown in FIG. 5, exhaust gas flows via the first recess 56. In other words, substantially all of the exhaust gas flows through the primary flow passage. As mentioned above, the first recess 56 defines at least part of the primary flow passage. Minimal, if any, exhaust gas flows via the secondary flow passage in the 100% turbine regime. Again, as mentioned above, the secondary flow passage is at least partly defined by the second recess 58.

The FIG. 5 arrangement may otherwise be described as the valve rotor 40 being in its fully open position. Accordingly, there is minimal pressure drop across the rotary valve 30 when the valve rotor 40 is in the fully open position. In other words, there is minimal resistance to the exhaust gas flow across the rotary valve 30.

The 100% turbine regime is most likely to be used when the engine and turbine are operating at a peak torque condition. The 100% turbine regime is therefore likely to be used when it is desired that all of the exhaust gas flow is directed through the turbine.

Figure 6:
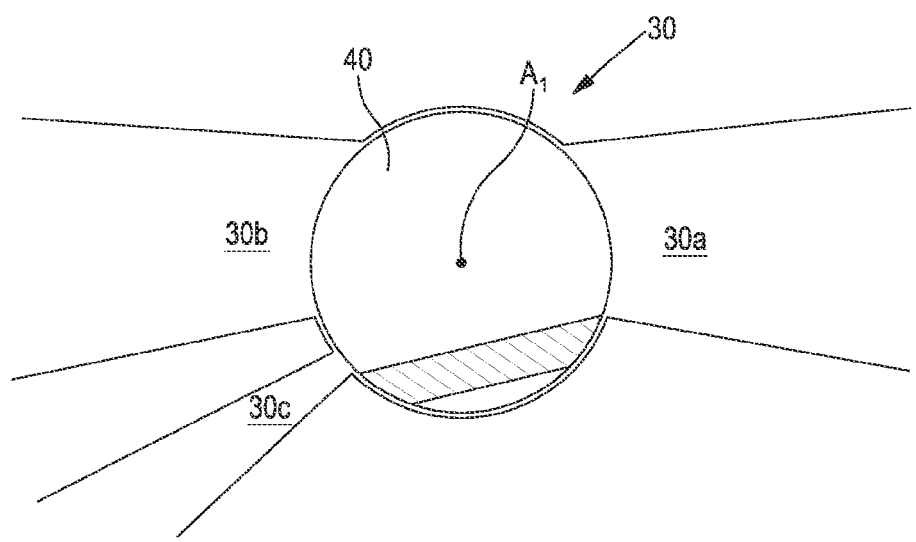

FIG. 6 shows the rotary valve 30 in a wastegate mode. The wastegate mode may otherwise be referred to as a partial wastegate mode, or a partial bypass mode. In the wastegate mode, the outlet port 30*a* is open and the bypass port 30*c* is also open. Furthermore, the inlet port 30*b* is also not obstructed by the sealing section 50. In other words, the inlet port 30*b* is also open. All ports are therefore open. In the wastegate mode, and as suggested by the name, some of the exhaust gas flow, which would otherwise flow through the outlet port 30*a*, is instead directed to the bypass port 30*c*. This is equivalent to the typical function of a wastegate in a turbocharger, which reduces the proportion of the flow which is expanded across the turbine by diverting a proportion of the flow before it reaches the turbine.

The wastegate mode may be used in a number of different scenarios including preventing turbine overspeed. In other words, the wastegate mode may be used to control the rotational speed of the turbine. Such controlling may include reducing the rotational speed of the turbine. Another scenario in which the wastegate mode may be used is to control the boost pressure of air supplied to the engine when the turbine forms part of a turbocharger. In such circumstances, the speed of the turbine is representative of the boost pressures generated by the compressor (owing to the compressor being driven by the turbine). As such, the wastegate mode can be used to control the boost pressure delivered by a turbocharger to the engine. Controlling the boost pressure may include either increasing, or reducing, the boost pressure delivered to the engine. In the wastegate mode, substantially all of the exhaust gas flows through the primary flow passage. Substantially no exhaust gas flows through the secondary flow passage.

Due to the position of the valve rotor 40 in the wastegate mode, there is exhaust gas flow through both the outlet port 30*a* and the bypass port 30*c*. That is to say, all of the ports are open. A greater proportion of the exhaust gas flows through the outlet port 30*a* than the bypass port 30*c*. This may be at least in part due to the relative position of the bypass port 30*c* to the inlet port 30*b* and/or due to the relative cross-sectional area of the outlet port 30*a* and the bypass port 30*c*.

Figure 7:
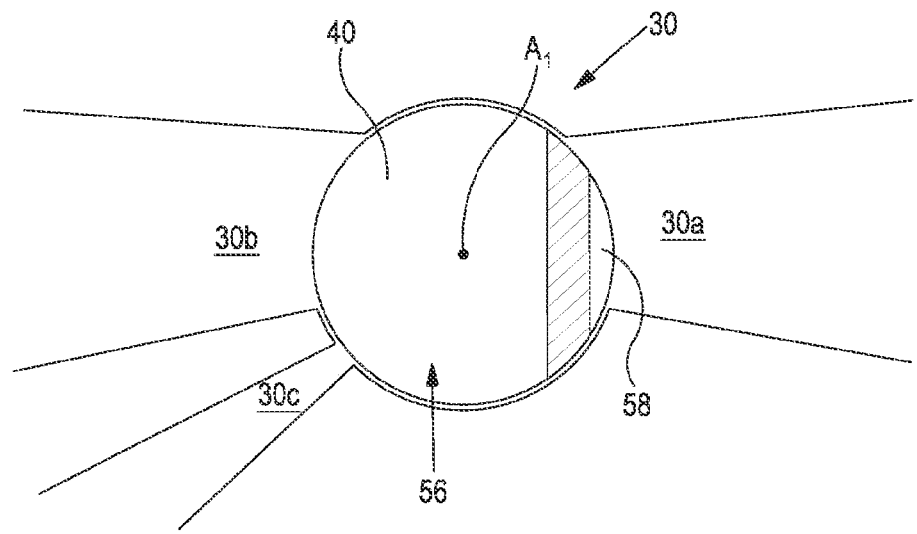

In FIG. 7 the rotary valve 30 is shown in a complete turbine bypass mode. In this mode, the outlet port 30*a* is substantially blocked. That is to say, the sealing section 50 substantially prevents any exhaust gas from flowing through the outlet port 30*a*. With the inlet port 30*b* and bypass port 30*c* open, the exhaust gas flows via the inlet port 30*b* and out through the bypass port 30*c*. Substantially all of the exhaust gas therefore flows to the exhaust aftertreatment system. The exhaust gas flows through the first recess 56. In other words, the exhaust gas flows through the primary flow passage. Substantially no exhaust gas flows through the second recess 58, and so the secondary flow passage.

In this mode, the temperature of the exhaust gas is not reduced due to it being expanded across the turbine. That is to say, because the outlet port 30*a* is blocked, the exhaust gas does not flow to the turbine and so is not expanded across thereacross. The exhaust gas temperature is therefore not significantly reduced. Furthermore, because no exhaust gas is expanded across the turbine, minimal work is done by the exhaust gas in driving the turbine. As such, the supply of air to the engine via the compressor, where the turbine forms part of a turbocharger, is greatly reduced. This further increases the temperature of the exhaust gas, where the same fuel rate is provided to the engine, owing to a reduction in the air to fuel ratio. With that said, in practice the bypass port 30*c* may be reduced in cross sectional area in order to further increase engine pumping work (explained in more detail below). This may require that more fuel is provided to the engine in order to overcome the increase in pumping work (due to the engine pumping exhaust gases against the higher pressure gradient). In other words, more fuel may be provided to the engine, if it is desired to maintain the same engine speed, due to the increase in pumping work.

Figure 8:
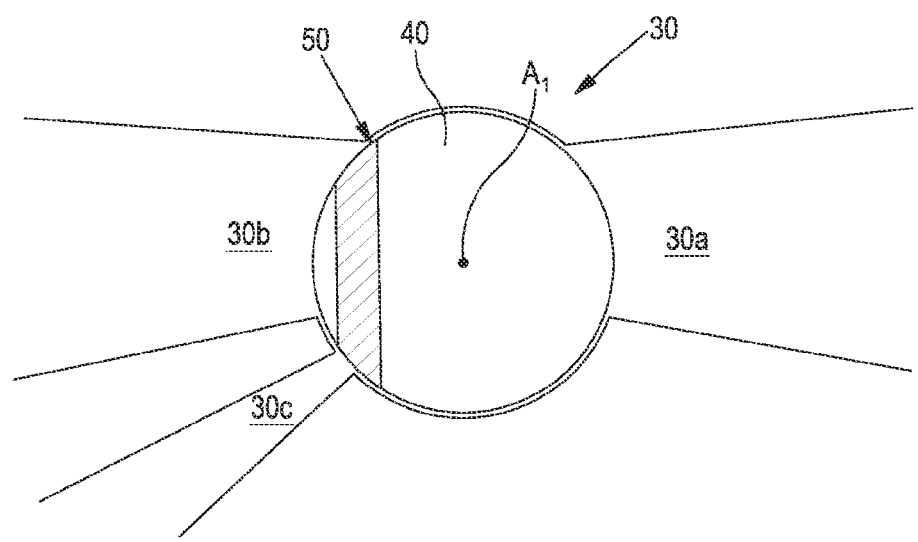

FIG. 8 shows the rotary valve 30 in a braking mode. As shown in FIG. 8, in the braking mode the inlet port 30*b* is substantially blocked by the sealing section 50. As such, there is minimal, if any, exhaust gas flow through either of the bypass port 30*c* and the outlet port 30*a*. Whilst the inlet port 30*b* is substantially blocked, due to the pressure of the exhaust gas there may be some leakage past, or around, the valve rotor 40. There may therefore be a small amount of leakage flow around the valve rotor 40, which flows into the bypass port 30*c* and/or the outlet port 30*a*.

Typically in the braking mode, no fuel is supplied to the engine.

The rotational position of the valve rotor 40 in the FIG. 8 arrangement, or the braking mode, increases the pressure drop across the rotary valve 30. As such, there is an increased back pressure both at, and upstream of, the inlet port 30*b*. This increased back pressure necessitates an increase in the pumping work from the engine in order to continue to pump the exhaust gas across the increased pressure gradient. As such, more work is done by the engine in pumping out the exhaust gas than would normally be the case. Because of the increased back pressure, more of the work done by the engine is expended in pumping the exhaust gas. Less power is therefore available for driving the pistons and the crankshaft. This results in a braking force being exerted by the engine, which results in a slowdown of the vehicle. Because of the increased back pressure, and increase in pumping work, the temperature and/or pressure of the exhaust gas is also increased. The engine may be described as absorbing its power by virtue of the increased pumping work, to thereby provide braking power for the vehicle.

To summarise, in the braking mode there is minimal exhaust gas flow to the turbine through the outlet port 30a, and minimal exhaust gas flow to the aftertreatment system through the bypass port 30c. Substantially no exhaust gas flows through the primary flow passage.

Figure 9:
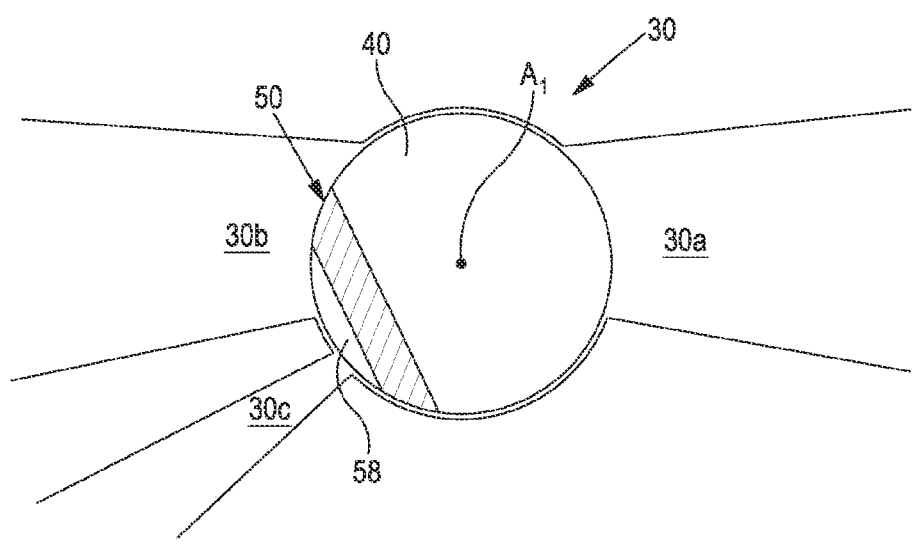

FIG. 9 shows the rotary valve 30 in a thermal management regime. The thermal management regime may be otherwise described as a backpressure generation and/or improved aftertreatment heating mode or regime.

In the thermal management regime, the temperature of the exhaust gas flowing into the aftertreatment system via the bypass port 30c is increased. In the thermal management regime, the inlet port 30b is at least partly blocked by the sealing section 50. Furthermore, the bypass port 30c is open.

The flow of exhaust gas is directed predominantly from the inlet port 30b to the bypass port 30c. It is the second recess 58 which provides the fluid communication between the inlet port 30b and the bypass port 30c. The secondary flow passage, which is at least partly defined by the second recess 58, therefore permits fluid communication between the inlet port 30b and bypass port 30c. In the specific rotational position shown in FIG. 9, the first recess 56 also provides fluid communication between the inlet port 30b and the outlet port 30a. In other words, the primary flow passage, at least partly defined by the first recess 58, permits fluid communication between the inlet port 30b and the outlet port 30a. This provides a useful "modulating" functionality (or modulation functionality) in that the rotational position of the valve rotor 40 can be adjusted to increase or reduce the proportion of the exhaust gas which flows through the outlet port 30a. This will be described in greater detail below.

Substantially blocking the inlet port 30b when the engine is in a non-braking, or fired, mode (i.e. when fuel is being provided to the engine) means that the resultant pumping work increases. The pumping work increasing leads to an increase in the exhaust gas temperature. This is due to the engine doing more work to pump the exhaust gas across the rotary valve 30 against the higher pressure gradient. The exhaust gas temperature increases according to the work done, which is defined by the integral of PdV (where P is equal to the pressure, and dV is equal to the change in volume).

When the engine is in a braking mode, some fuel may be supplied if required. However, the majority of the pumping work is caused by the pressure drop across the rotary valve 30. In other words, most of the pumping work is due to gas from a cylinder (i.e. a combustion chamber of the engine) being forced into a higher pressure region of the rotary valve 30, when the inlet port 30b is substantially blocked, in comparison to the rotary valve 30 being open. Put another way, most of the pumping work is due to gas from the cylinder being forced into a higher pressure region upstream of the rotary valve 30, caused by the inlet port 30b of the rotary valve 30 being substantially blocked. This means that more work must be done by a piston in the cylinder to expel the exhaust gas. Specifically, more work must be done by the piston to expel the exhaust gas into the raised pressure region upstream of the rotary valve 30. The addition of fuel, and subsequent combustion thereof, into the cylinder causes a significant increase in the volume of the gas because the combustion products take up a greater volume than the individual liquid fuel and air components. This increase in volume leads to an increase in the work done, as indicated by the equation set out above.

The exhaust gas temperature also increases due to the additional fuel which is needed in the engine to prevent the engine speed dropping below a target value. Because of the increase in pumping work, more fuel is required, by the engine, in order to maintain the same engine speed (as defined by the ECU). The increased amount of fuel in the engine results in a lower air to fuel ratio and thus a high temperature of the exhaust gas. The air to fuel ratio is further lowered due to the fact that the bulk of the exhaust gas is not flowing through the outlet port 30a i.e. to the turbine. As such, when the turbine forms part of a turbocharger, minimal work is done by the exhaust gas to drive the turbine, and so minimal work is done to drive the compressor. This results in a low boost pressure i.e. a reduced amount of air, and at a lower pressure, being delivered to the intake manifold of the engine. This further reduces the air to fuel ratio and therefore further increases the exhaust gas temperature.

Returning to the modulation functionality briefly mentioned above, the back pressure across the rotary valve 30 can be modulated by rotating the valve rotor 40 in order to generate a desired exhaust gas temperature at the exhaust aftertreatment device. Such a desired temperature may be of the order of at least around 200° C., for example at least around 190° C. However, it will be appreciated that this is dependent upon the specific engine arrangement and, more specifically, the chemistry thereof. The modulation means that excess back pressure can largely be avoided. In other words, the inlet port 30b is only substantially blocked to the extent required in order to obtain the desired exhaust gas temperature. This is beneficial in that increased back pressure results in a reduced fuel economy. As such, modulating the back pressure by rotating the valve rotor 40 can be used to improve fuel economy. This is achieved by avoiding an excessive back pressure and so excessively high amount of fuel injected into the engine. Put another way, the modulation involves selectively opening and closing the primary flow passage whilst the secondary flow passage remains open.

The modulation functionality is also beneficial in being able to avoid an overpressure condition in the exhaust manifold owing to the increase in backpressure upstream of the inlet port 30b.

Modulation can therefore be used to adjust the back pressure, and so exhaust gas temperature, as required. Described another way, variation of the rotational position of the valve rotor 40 may be used to modulate the back pressure and so adjust the exhaust gas temperature.

There are some similarities between the complete turbine bypass regime shown in FIG. 7 and the thermal management regime shown in FIG. 9. Both of these regimes provide fluid communication between the inlet port 30b and the bypass port 30c. However, it will be noted that this is achieved by way of the primary and secondary flow passages respectively, or via first and second recesses 56, 58 respectively.

The difference between the modes is that in the thermal management mode, shown in FIG. 9, there is an increase in back pressure due to the inlet port 30b being at least partially blocked by the sealing section 50. Under certain low load engine conditions and/or low speed engine conditions the temperature of exhaust gas which is required in order to activate and/or increase the efficiency of operation of the exhaust aftertreatment system cannot be provided by only directing all of the exhaust gas from the inlet port 30b to the bypass port 30c. As such, in some circumstances an additional back pressure is required in order to further increase the temperature of the exhaust gas which flows through the bypass port 30c and to the exhaust aftertreatment system. This is achieved by the thermal management regime, owing to the inlet port 30b being at least partially blocked by sealing section 50 of the valve rotor 40.

The second recess 58 therefore provides a simple to manufacture feature which can allow fluid communication between the inlet and bypass ports 30b, 30c whilst the inlet port 30b is at least partially blocked. This has the effect that an increase in the exhaust gas temperature can be obtained. Furthermore, the increased temperature exhaust gas can still be directed to the bypass port 30c.

Figure 4:
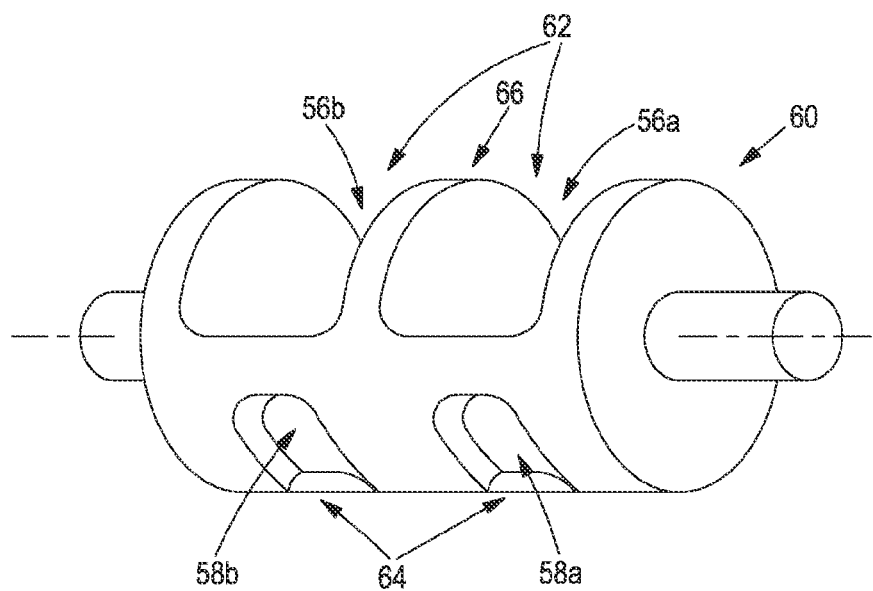
FIG. 4 shows a perspective view of a modified valve rotor according to an embodiment of the present disclosure.

Whilst FIGS. 5 to 9, i.e. the different modes of operation, have been described in connection with the valve rotor 40 according to the first embodiment (shown in FIG. 3), it will be appreciated that the description and Figures are equally applicable to the twin passage variant of the valve rotor 60 as shown in FIG. 4.

FIGS. 10 to 13 show perspective views of four different embodiments of valve rotors, similar to that shown in FIG. 4. For ease of reference, the numerals of like features are incremented by 100 for each different embodiment.

Figure 10:
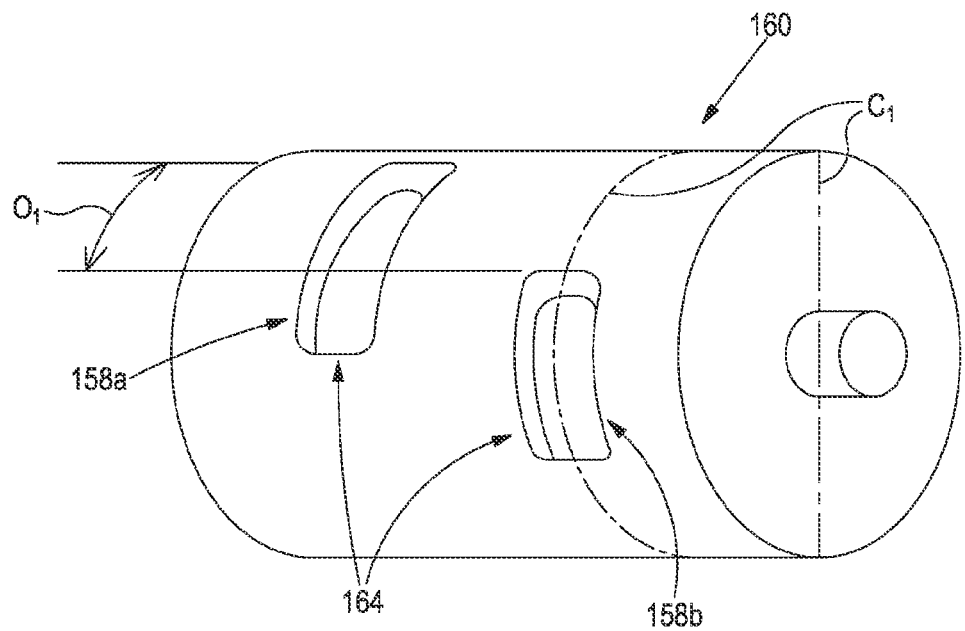
FIGS. 10-13 show perspective views of various embodiments of the valve rotor of FIG. 4.

Beginning with FIG. 10, a valve rotor 160 is shown. The valve rotor 160 shares many features in common with the valve rotor 60 of FIG. 4, which will therefore not be described in detail.

Of note, the valve rotor 160 is rotated relative to the position of the valve rotor 60 of FIG. 4. Furthermore, the primary recess, or primary recesses, are not visible in FIG. 10.

A secondary arrangement 164 of two second recesses 158a, 158b is visible in FIG. 10. In FIG. 10, the second recesses 158a, 158b are both generally rectangular. That is to say, both second recesses are defined by two pairs of substantially parallel sides. The second recesses 158a, 158b therefore both have substantially the same shape.

Each of the second recesses 158a, 158b are of uniform depth i.e. they are recessed to the same extent relative to an outer radius of the valve rotor 160. Furthermore, each of the second recesses 158a, 158b have substantially the same depth.

Of note in FIG. 10, the second recesses 158a, 158b are not circumferentially aligned. That is to say, a first of the second recesses 158a is disposed at a different circumferential position to a second of the second recesses 158b. This is indicated by $O_1$. An advantage of the circumferential offset is that the passage of exhaust gas flow through the bypass port whilst the rotary valve is in the thermal management regime can be more precisely controlled. For example, for a given rotational position of the valve rotor 160, a first secondary flow passage defined by the first second recess 158 may be open. At the same rotational position of valve rotor 160, a second secondary flow passage defined by the second second recess 158b may be closed. This has the effect that exhaust gas flow can pass through the first secondary flow passage, but not the second. Rotation of the valve rotor 160 in either direction can therefore be used to increase or decrease the proportion of exhaust gas which flows through the bypass port from the inlet port.

A cross-section plane C1 is indicated on the valve rotor 160, and will be discussed in more detail in connection with FIGS. 14 and 15.

Figure 11:
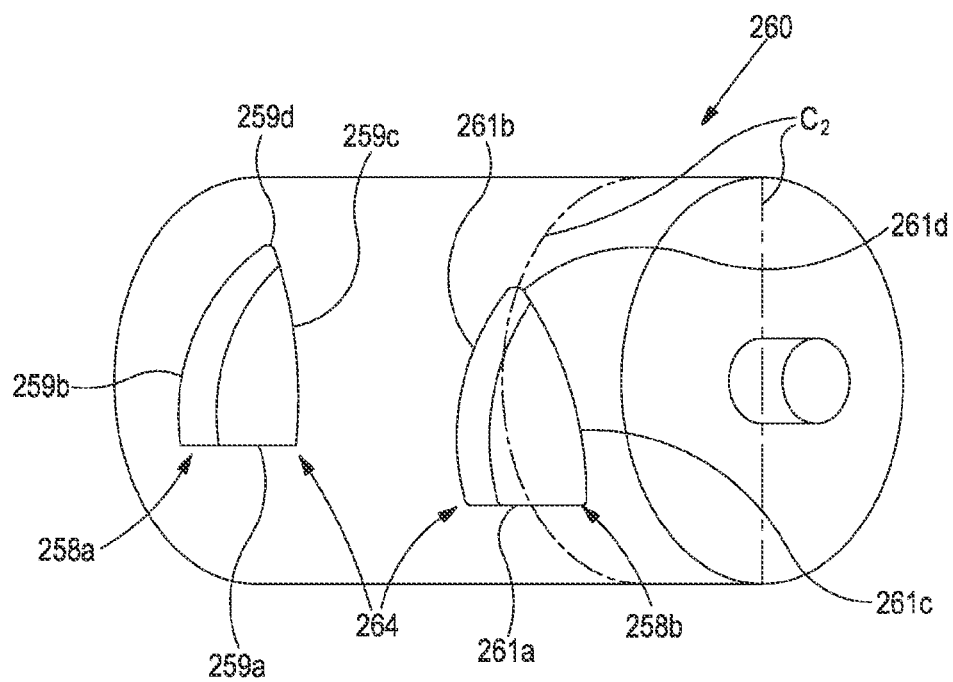

FIG. 11 shows a perspective view of a further embodiment of valve rotor 260. Once again, the valve rotor 260 incorporates a secondary arrangement 264 of second recesses 258a, 258b.

The second recesses 258a, 258b are generally triangular. That is to say, they are each defined by a substantially horizontal base 259a, 261a, and two inclined sides 259b, 259c, 261b, 261c which stem from ends of the base and merge at an apex 259d, 261d. As illustrated in FIG. 11, the inclined sides may be arcuate i.e. curved.

The generally triangular geometries of the second recesses 258a, 258b are just one example of a geometry having a cross-sectional area which changes along the circumference. In other words, as the circumferential position about the valve rotor 260 is changed, a cross-sectional area of the geometries of the second recesses 258a, 258b also changes. In this specific example, the cross-sectional area is greatest at the base of the triangle, and smallest at the apex. The second recesses 258a, 258b can therefore be said to have a wide end, and a thin end, corresponding with the base and the apex respectively.

This difference in cross-sectional area of the second recesses 258a, 258b can be used to determine how to orient the geometries of the second recesses 258a, 258b on the valve rotor 260. This, in turn, can be used to allow greater control over the extent to which the secondary flow passage(s) are open when the valve rotor 260 is in the thermal management regime.

In some arrangements, it may be desirable to position the second recesses 258a, 258b such that the thin end is more directly exposed to the inlet port when the valve rotor 260 is in the thermal management regime. In such a configuration, the thin end can be used to gradually open the secondary flow passage(s) when it is desirable to bleed some exhaust gas through the bypass port.

In other arrangements, it may be desirable to position the second recesses 258a, 258b such that the wide end is more directly exposed to the inlet port when the valve rotor 260 is in the thermal management regime. In such a configuration, the wide end can be used to initially open the secondary flow passage(s) to a greater extent than would be afforded by the thin end. Continued rotation of the valve rotor 260 would then increase, but by a reducing extent (or at a reducing rate), the extent to which the secondary flow passage(s) is open.

There are many variations which are possible in view of the above. For example, where the second recesses are of a variable geometry (i.e. with a cross-section which changes with circumferential position e.g. triangular, teardrop-shaped) the second recesses could be oriented such that a thin end of one second recess circumferentially aligns with a wide end of the other second recess. In other words, the two second recesses could be aligned such that their geometries are of opposite orientations. Alternatively, as shown in FIG. 11, the geometries may be of the same orientation.

Once again, a cross-section plane C2 is indicated and will be discussed in detail below.

Figure 12:
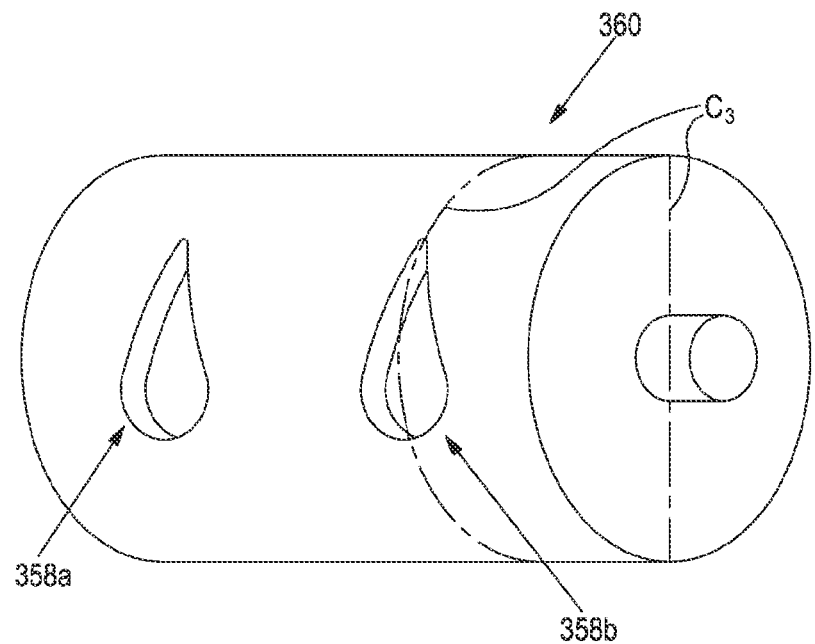

FIG. 12 shows a further embodiment of a valve rotor 360. Second recesses 358a, 358b of the valve rotor 360 are teardrop-shaped. Teardrop-shaped may otherwise be described as an ellipse with a pointed end, in other words a stretched ellipse.

All of the above description, regarding wide and thin ends, and considerations for orienting the second recesses, is equally applicable to the second recesses 358a, 358b of the valve rotor 360.

A cross-section plane C3 is indicated and will be discussed below.

Figure 13:
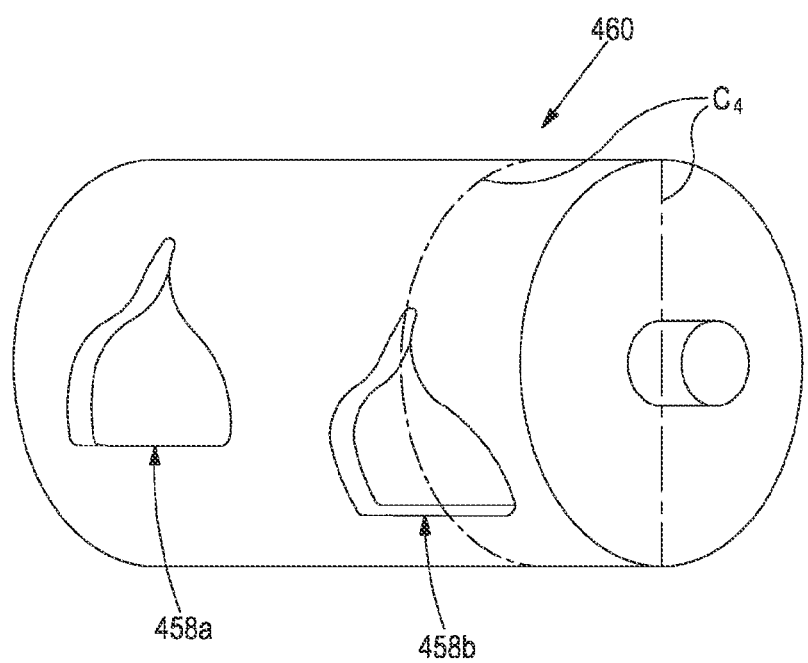

FIG. 13 shows a further embodiment of a valve rotor 460. Second recesses 458a, 458b of the valve rotor 460 are shaped like wine glasses (truncated teardrops or funnels). That is to say, the second recesses 458a, 458b are of a geometry which is substantially semi-circular with a pointed tip. The wine glass shape of the second recesses 458a, 458b is just one specific example of an arbitrary shape which the second recesses 458a, 458b may take.

As with the previous figures, a cross-section plane C4 is also indicated.

Given the above discussion regarding the possible geometries of second recess, it will also be appreciated that the second recesses may have dissimilar geometries. That is to say, one of the second recesses may be a first geometry, and the other second recess may be a second geometry. Furthermore, whilst the shapes, or geometries, of the second recesses may be the same, the second recesses may be scaled differently. For example, whilst both second recesses may be generally rectangular, a first of the second recesses may be a first size, and a second of the second recesses may be a second size which differs from the first size.

Figure 14:
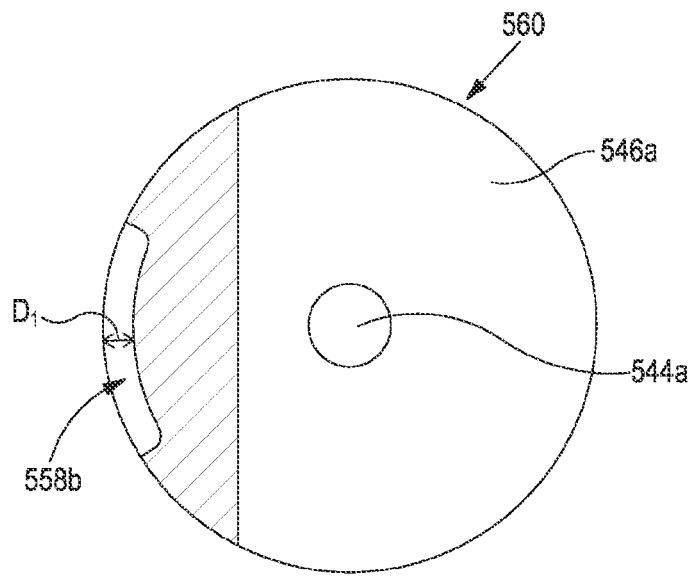
FIGS. 14 and 15 are examples of cross-section views of the valve rotors of FIGS. 10-13.
Figure 15:
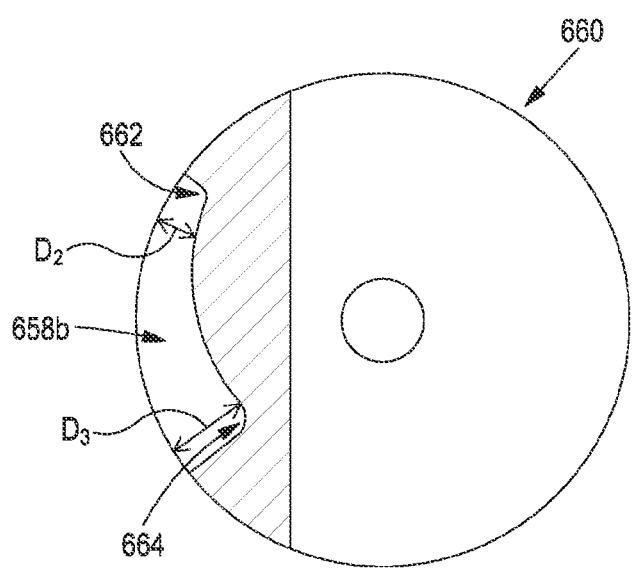

Moving on to FIGS. 14 and 15, these are part cross-section views of two valve rotors. The part-cross-section view is owing to the fact that the cross-sections shown in FIGS. 14 and 15 correspond with the planes defined by C1, C2, C3 and C4. In other words, only part of the valve rotors is shown in cross-section, hence a first recess, or first recesses, are not visible in the views illustrated in FIGS. 14 and 15.

Beginning with FIG. 14, a valve rotor 560 is shown in cross-section. The portion of the valve rotor 560 which is cutaway, i.e. the cross-section portion, is indicated by a hatched line. The non-cross-section portion of the valve rotor 560 simply shows an end wall 546a and spindle 544a.

The valve rotor 560 incorporates a second recess 558b which is of uniform depth. That is to say, the second recess 558b is recessed to a substantially constant depth relative to an outer radius of the valve rotor 560. The depth to which the second recess 558b is recessed is indicated by $D_1$.

An advantage of the second recess 558b being of a uniform depth is that the second recess 558b may be easier to manufacture. For example, by way of milling on a multi-axis mill. Furthermore, the uniform depth may be desirable in that the secondary flow passage, defined by the second recess 558b, may be opened proportionally to the rotational position of the valve rotor 560 in use. This may make control of exhaust gas flow using the valve rotor 560 simpler.

Moving to FIG. 15, a valve rotor 660 is shown in cross-section. Much of the above description, with respect to FIG. 14, is also applicable to FIG. 15 and so, in the interest of brevity, such description is not repeated.

A notable distinction between the valve rotors 660 and 560 is that, in FIG. 15, the valve rotor 660 comprises a second recess 658b which is of a non-uniform depth. That is to say, the depth of the second recess 658b varies substantially continuously circumferentially. This can be seen in the form of the depth of the second recess 658b at two circumferential points, as indicated by $D_2$ and $D_3$, being different from one another.

It will be appreciated that a non-uniform depth covers a range of different examples. For example, the second recess could have two distinct depths, with a step change therebetween. Alternatively, and as illustrated in FIG. 15, the second recess 658b may have a depth which varies substantially continuously about the circumference of the valve rotor 660. Where the depth is said to vary substantially continuously about the circumference, it will be appreciated that this is only the case along, or spanning, the second recess. That is to say, where the second recess only occupies a portion of the circumference of the valve rotor, the depth of the second recess clearly only varies within the circumferential limits of the second recess (i.e. the portion of the valve rotor occupied by the second recess).

A non-uniform depth may be desirable because the flow regime exhibited by the valve rotor 660 may be more accurately controlled. Specifically, it may be desirable to initially open a secondary flow passage, defined by the second recess 658b, by a first extent. A second extent of opening of the secondary flow passage, once the valve rotor 660 has continued to rotate by a given degree, may only be slightly more than the first extent. This could allow for fine tuning of the opening of the secondary flow passage after an initial opening has occurred. Put another way, the extent to which the secondary flow passage is opened may not be directly proportional to the rotational position of the valve rotor 660. In other words, continued rotation of the valve rotor 660 may continue to open the secondary flow passage, but to a decreasing extent.

The reverse of the above arrangement is also considered, whereby it may be desirable to initially only slightly open the secondary flow passage, and wherein continued rotation of the valve rotor 660 opens the secondary flow passage to an increasing extent. In particular, the difference in the extent to which the secondary flow passage opens, for given increments of rotation, may increase with rotation of the valve rotor 660.

A non-uniform depth of second recess may also be desirable for reasons of simpler manufacture. For example, a second recess could be manufactured in a single milling process in which, with the valve rotor held in position, the tool removes a plane of material. Given the rotary nature of the valve rotor, the removal of a plane of material could form a second recess having a non-uniform depth which is continuously circumferentially variable.

Where the second recess is of a non-uniform depth, there may be a shallow end and a deep end. The shallow end 662 and deep end 664 are indicated on the second recess 658b of the valve rotor 660.

The above discussion, regarding whether it is desirable to initially open the secondary flow passage by a relatively large or a relatively small extent, depends at least in part upon the orientation of the shallow and deep ends 662, 664 of the second recess 658b. In other words, where it is desirable to initially open the secondary flow passage to a greater extent, the deep end 664 may be more directly exposed to the inlet port when the valve is in a thermal management regime (the regime shown in FIG. 9). Where it is desirable to initially open the secondary flow passage to a lesser extent, the shallow end 662 may be more directly exposed to the inlet port when the valve is in a thermal management regime.

It will be appreciated that the uniform or non-uniform depths of second recesses, as shown in FIGS. 14 and 15, can apply to any of the geometries illustrated in FIGS. 10-13. Furthermore, the uniform or non-uniform depths are equally applicable to a variety of other geometries, as will be appreciated by the skilled person.

As discussed above, it may be desirable to manipulate the geometry, orientation of the geometry, depth, orientation of the deep/shallow ends of one or more second recesses. This may be for reasons of ease of manufacture and/or control of the extent of the opening of the secondary flow passage. Where two second recesses are present, a further criterion which can be adjusted is that of a circumferential offset between the recesses. Adjustment of the circumferential offset, as well as the other aforementioned variables, may mean that the second recesses, and so secondary flow passages, open at different rotational positions of the valve rotor.

For greater control, and where a variable geometry of second recess is used, the depth of the second recess can also be made non-uniform. Furthermore, where there are two or more second recesses, the circumferential offset, geometries, depths, uniformity of the depths and/or orientations (of both geometry and depths) can be varied accordingly between the two second recesses. Alternatively, the second recesses may be a pair of like second recesses, which are of substantially the same geometry, depth and orientation.

The primary flow passage may be described as a main passage. The secondary flow passage may otherwise be described as a bleed passage. The second recess 58 may otherwise be described as a circumferential recess.

The above-described disclosure is particularly useful in reducing NOx (nitrous oxide) emissions. However, it will be appreciated that the disclosure can assist in reducing a variety of different types of emissions. This is owing to the ability to increase the temperature of exhaust gas flowing to the exhaust aftertreatment system.

In a preferred arrangement the exhaust aftertreatment system comprises a reductant and a catalyst. The catalysis is influenced by the exhaust gas temperature. At low engine loads and power, the exhaust gas temperature may be low and the effectiveness of the catalysis may be reduced as a result thereof. For simplicity, durability and packaging reasons, a catalytic NOx converter may be positioned downstream of the turbine. The turbine relies on an expansion process to generate power (to drive the compressor when the turbine forms part of a turbocharger). The expansion process further reduces the exhaust gas temperature.

Managing, or adjusting, the temperature of exhaust gas which flows via the bypass port 30c to the exhaust aftertreatment system may be referred to as "thermal management".

In preferred embodiments, the valve rotor 40 is moveable about the valve axis $A_1$ in order to selectively open and close the primary flow passage whilst the secondary flow passage remains open. In other words, this is the modulation functionality described above. The modulation allows the back pressure to be adjusted, to lessen any reduction in fuel economy, whilst providing a flow of exhaust gas, at an increased temperature, to the exhaust aftertreatment system through the bypass port 30c.

Where a plurality of second recesses are present, they may have one or more of the same geometry, depth, volume and circumferential position. Alternatively, one or more of these criteria may be different between the plurality of second recesses (e.g. relative to one another, if there are two second recesses).

One second recess may be present, or a plurality of second recesses may be present. The plurality of second recesses may be two or more second recesses.

The disclosure provides a device which functions like a conventional wastegate/turbine bypass/engine braking valve, but which also allows a full bypass of the turbine to provide higher temperature exhaust gas to the exhaust aftertreatment system.

The described and illustrated embodiments are to be considered as illustrative and not restrictive in character, it being understood that only preferred embodiments have been shown and described and that all changes and modifications that fall within the scope of the disclosures as defined in the claims are desired to be protected.

In relation to the claims, it is intended that when words such as "a," "an," "at least one," or "at least one portion" are used to preface a feature there is no intention to limit the claim to only one such feature unless specifically stated to the contrary in the claim.

Optional and/or preferred features as set out herein may be used either individually or in combination with each other where appropriate and particularly in the combinations as set out in the accompanying claims. The optional and/or preferred features for each aspect of the disclosure set out herein are also applicable to any other aspects of the disclosure, where appropriate.

What is claimed:

1. A rotary turbine bypass valve for an engine arrangement, the rotary turbine bypass valve comprising:
    a valve chamber positioned at a junction of an inlet port, an outlet port and a bypass port, the inlet port configured to fluidly communicate with a flow of exhaust gas from an engine, the outlet port configured to fluidly communicate with an inlet of a turbine, and the bypass port configured to fluidly communicate with an exhaust aftertreatment device; and
    a valve rotor supported for rotation, about a valve axis, within the valve chamber, the valve rotor comprising a first recess and a second recess, the first recess defining at least part of a primary flow passage, the second recess defining at least part of a secondary flow passage;
    wherein the valve rotor is rotatable about the valve axis between a first position in which the valve rotor substantially blocks exhaust gas flow through the bypass port and a second position in which the valve rotor permits exhaust gas flow through the bypass port;
    wherein the secondary flow passage is configured to selectively permit fluid communication between the inlet port and the bypass port when the primary flow passage is at least partially blocked;
    wherein the second recess is one of two second recesses forming part of a secondary arrangement, and the first recess is one of two first recesses forming part of a primary arrangement; and
    wherein the second recesses are smaller than the first recesses.

2. The rotary turbine bypass valve claim 1, wherein at least one of the second recesses spans at least a portion of an outer circumference of the valve rotor.

3. The rotary turbine bypass valve of claim 1, wherein at least one of the second recesses opposes a corresponding first recess.

4. The rotary turbine bypass valve of claim 1, wherein at least one of the first and at least one of the second recesses are separated by a barrier.

5. The rotary turbine bypass valve of claim 4, wherein the barrier defines a chord of the valve rotor.

6. The rotary turbine bypass valve of claim 1, wherein the valve rotor is movable about the valve axis to selectively open and close the primary flow passage whilst the secondary flow passage remains open.

7. The rotary turbine bypass valve of claim 1, wherein the secondary flow passage is configured to selectively provide fluid communication between the inlet port and the bypass port when the primary flow passage is substantially blocked.

8. The rotary turbine bypass valve claim 1, wherein at least one of the second recesses has a non-uniform depth.

9. The rotary turbine bypass valve of claim 1, wherein both of the second recesses have substantially the same shape.

10. The rotary turbine bypass valve of claim 1, wherein the second recesses have substantially the same depths.

11. The rotary turbine bypass valve of claim 1, wherein the second recesses have different depths.

12. The rotary turbine bypass valve of claim 1, wherein the second recesses are circumferentially aligned.

13. The rotary turbine bypass valve of claim 1, wherein the second recesses are circumferentially offset.

14. The rotary turbine bypass valve of claim 1, wherein the first and/or second arrangements are symmetrically disposed about a length of the valve rotor.

15. The rotary turbine bypass valve according to claim 1, wherein the turbine forms part of a turbocharger.

16. An engine arrangement comprising an engine, a turbine and the rotary turbine bypass valve according to claim 1.

17. A method of operating the rotary turbine bypass valve of claim 1, wherein the rotary turbine bypass valve exhibits the following flow regimes in order as the valve rotor rotates from a position in which the outlet port is substantially blocked, the method comprising:
 (i) substantially blocking the outlet port with the valve rotor during a complete turbine bypass regime;
 (ii) substantially blocking the inlet port during a braking regime;
 (iii) at least partially blocking the primary flow passage during a thermal management regime, wherein during the thermal management regime the secondary flow passage permits fluid communication between the inlet port and the bypass port;
 (iv) substantially blocking the bypass port and opening the inlet port and the outlet port during a 100% turbine regime; and
 (v) opening the outlet port and at least partially opening the bypass port during a wastegate regime.

18. The method of claim 17, wherein the rotational position of the valve rotor is adjusted from the position of step (iii) to increase or reduce the extent of the blockage of the primary flow passage to adjust a temperature and/or pressure of the exhaust gas in the inlet port.

* * * * *